(12) United States Patent
Mundra et al.

(10) Patent No.: US 12,101,293 B2
(45) Date of Patent: *Sep. 24, 2024

(54) SYSTEM ON CHIP FIREWALL MEMORY ARCHITECTURE

(71) Applicant: Texas Instruments Incorporated, Dallas, TX (US)

(72) Inventors: Amritpal Singh Mundra, Allen, TX (US); Chunhua Hu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 431 days.

This patent is subject to a terminal disclaimer.

(21) Appl. No.: 17/392,497

(22) Filed: Aug. 3, 2021

(65) Prior Publication Data

US 2021/0367922 A1    Nov. 25, 2021

Related U.S. Application Data

(63) Continuation of application No. 16/221,318, filed on Dec. 14, 2018, now Pat. No. 11,115,383.
(Continued)

(51) Int. Cl.
*H04L 29/06* (2006.01)
*G06F 21/71* (2013.01)
(Continued)

(52) U.S. Cl.
CPC .......... *H04L 63/0218* (2013.01); *G06F 21/71* (2013.01); *G06F 21/76* (2013.01); *G06F 21/85* (2013.01); *H04L 63/0227* (2013.01)

(58) Field of Classification Search
CPC . H04L 63/0218; H04L 63/0227; G06F 21/71; G06F 21/76; G06F 21/85
See application file for complete search history.

(56) References Cited

U.S. PATENT DOCUMENTS

| 6,321,314 B1 * | 11/2001 | Van Dyke ............. G06F 12/145 711/163 |
| 6,795,905 B1 * | 9/2004 | Ellison ................ G06F 9/30189 711/170 |

(Continued)

FOREIGN PATENT DOCUMENTS

| CN | 105183373 A | * 12/2015 | |
| CN | 109791594 A | * 5/2019 | ......... G06F 12/1408 |

(Continued)

OTHER PUBLICATIONS

PCT Search Report dated Sep. 19, 2019.
European Search Report for 19806759.7 mailed May 26, 2021.

*Primary Examiner* — Sher A Khan
(74) *Attorney, Agent, or Firm* — Michael T. Gabrik; Frank D. Cimino

(57) ABSTRACT

In described examples, a system on a chip (SoC) and method for sending messages in the SoC include determining locations of initiator-side firewall block and receiver-side firewall block memories using respective pointers to the firewall block memories stored in a single, contiguous memory. Addresses of the pointers within the single memory depend on respective unique firewall identifiers of the firewall blocks. An exclusive security configuration controller uses the pointers to configure the firewall blocks over a security bus which is electrically isolated from a system bus. The system bus is used to send messages from sending functional blocks to receiving functional blocks. The initiator-side firewall block adds a message identifier to messages. The message identifier depends on the initiator-side firewall block's configuration settings. The receiver-side firewall block controls permission for the receiving functional block to access the message, depending on the message identifier and the receiver-side firewall block's configuration settings.

20 Claims, 3 Drawing Sheets

Related U.S. Application Data

(60) Provisional application No. 62/676,050, filed on May 24, 2018.

(51) Int. Cl.
 G06F 21/76 (2013.01)
 G06F 21/85 (2013.01)
 H04L 9/40 (2022.01)

(56) References Cited

U.S. PATENT DOCUMENTS

| | | | |
|---|---|---|---|
| 8,307,416 B2 | 11/2012 | Conti | |
| 8,356,184 B1 * | 1/2013 | Meyer | G06F 21/79 |
| | | | 711/100 |
| 8,806,140 B1 * | 8/2014 | Kraipak | G11C 7/20 |
| | | | 711/170 |
| 8,874,926 B1 | 10/2014 | Edwards et al. | |
| 9,305,142 B1 * | 4/2016 | Ybarra | G06F 21/79 |
| 2005/0021874 A1 * | 1/2005 | Georgiou | G06F 15/167 |
| | | | 709/250 |
| 2005/0147100 A1 * | 7/2005 | Biran | H04L 69/161 |
| | | | 370/412 |
| 2007/0011419 A1 | 1/2007 | Conti | |
| 2007/0022479 A1 * | 1/2007 | Sikdar | H04L 63/0218 |
| | | | 726/25 |
| 2007/0101414 A1 * | 5/2007 | Wing | H04L 61/2578 |
| | | | 726/5 |
| 2007/0174429 A1 * | 7/2007 | Mazzaferri | H04L 63/102 |
| | | | 709/218 |
| 2007/0250912 A1 | 10/2007 | Rassool et al. | |
| 2008/0163353 A1 * | 7/2008 | Conti | H04L 63/126 |
| | | | 711/E12.096 |
| 2009/0025077 A1 | 1/2009 | Trojanowski | |
| 2009/0049220 A1 | 2/2009 | Conti et al. | |
| 2009/0177826 A1 | 7/2009 | Conti et al. | |
| 2011/0016284 A1 * | 1/2011 | Balan | H04L 49/9042 |
| | | | 711/170 |
| 2011/0145909 A1 | 6/2011 | Rachakonda et al. | |
| 2012/0047366 A1 * | 2/2012 | Yoo | G06F 21/564 |
| | | | 726/13 |
| 2012/0202495 A1 * | 8/2012 | Gehlen | H04L 12/189 |
| | | | 455/456.3 |
| 2012/0311690 A1 | 12/2012 | Ellis | |
| 2012/0317224 A1 * | 12/2012 | Caldwell | H04W 72/542 |
| | | | 709/217 |
| 2014/0223569 A1 | 8/2014 | Gail et al. | |
| 2015/0006805 A1 * | 1/2015 | Feekes | G06F 1/32 |
| | | | 711/105 |
| 2015/0277949 A1 | 10/2015 | Loh et al. | |
| 2016/0004647 A1 | 1/2016 | Eppensteiner et al. | |
| 2016/0028728 A1 * | 1/2016 | Hampel | H04L 9/3234 |
| | | | 713/181 |
| 2016/0094552 A1 | 3/2016 | Durham et al. | |
| 2016/0371139 A1 * | 12/2016 | Stark | G06F 12/0284 |
| 2017/0004074 A1 * | 1/2017 | Frazier | G06F 12/0253 |
| 2017/0195884 A1 * | 7/2017 | Kang | H04L 63/10 |
| 2017/0344502 A1 | 11/2017 | Fernald | |
| 2018/0063100 A1 | 3/2018 | Peeters et al. | |
| 2018/0212839 A1 * | 7/2018 | Hiers | G06F 3/0483 |
| 2019/0095655 A1 | 3/2019 | Krawczewicz et al. | |

FOREIGN PATENT DOCUMENTS

| | | | | |
|---|---|---|---|---|
| EP | 1619572 A1 * | 1/2006 | | G06F 21/554 |
| WO | WO-03069909 A1 * | 8/2003 | | G06F 12/145 |
| WO | 2008081032 A1 | 7/2008 | | |
| WO | WO-2009023629 A2 * | 2/2009 | | G06F 12/0844 |
| WO | WO-2012127266 A1 * | 9/2012 | | G06F 11/1415 |
| WO | WO-2016109071 A1 * | 7/2016 | | G06F 21/554 |

* cited by examiner

SYSTEM ON CHIP FIREWALL MEMORY ARCHITECTURE

CROSS-REFERENCE TO RELATED APPLICATIONS

This application is a continuation of U.S. patent application Ser. No. 16/221,318, filed Dec. 14, 2018, which claims priority to, U.S. Provisional Patent Application No. 62/676,050, filed May 24, 2018. U.S. patent application Ser. No. 16/221,318 is related to U.S. patent application Ser. No. 15/679,307, filed Aug. 17, 2017. Each of these is incorporated by reference herein.

BACKGROUND

This application relates generally to hardware-based security in integrated circuit (IC) devices, and more particularly to memory and bus architecture of hardware-based security.

A system on a chip (SoC) comprises multiple functional blocks, with different functional blocks—and, typically, different sub-blocks within functional blocks—having different functions. For example, functional blocks or sub-blocks (for convenience, collectively referred to as "functional blocks" herein) on an SoC can include one or more microcontrollers, microprocessors, or digital signal processor (DSP) cores; memory blocks, such as read-only memory (ROM) or random-access memory (RAM); clock signal generators; input/output (I/O) interfaces; analog interfaces; voltage regulators and power management circuits; and intellectual property (IP) cores. Hardware-based security, i.e., controlling at a hardware level the message flow among functional blocks, can be used to harden an SoC against attackers attempting to gain unauthorized access to (for example) message contents, memory contents, device functions, and device I/O and corresponding communication permissions.

SUMMARY

In described examples, a system on a chip (SoC) and method for sending messages in the SoC include determining locations of initiator-side firewall block and receiver-side firewall block memories using respective pointers to the firewall block memories stored in a single, contiguous memory. Addresses of the pointers within the single memory depend on respective unique firewall identifiers of the firewall blocks. An exclusive security configuration controller uses the pointers to configure the firewall blocks over a security bus which is electrically isolated from a system bus. The system bus is used to send messages from sending functional blocks to receiving functional blocks. The initiator-side firewall block adds a message identifier to messages. The message identifier depends on the initiator-side firewall block's configuration settings. The receiver-side firewall block controls permission for the receiving functional block to access the message, depending on the message identifier and the receiver-side firewall block's configuration settings.

DETAILED DESCRIPTION

Robust system on a chip (SoC) hardware-based security can use hardware-enforced mutual isolation of different functional blocks from each other. That is, messages sent by a functional block at a corresponding security level or within a corresponding secure region of the SoC should be restricted from accessing resources within a functional block at a different security level or within a different secure region of the SoC. Restriction can depend, for example, on properties (such as permissions, encryption, and cryptographic key accessibility) of respective messages, sending functional blocks, and receiving functional blocks.

Figure 1:
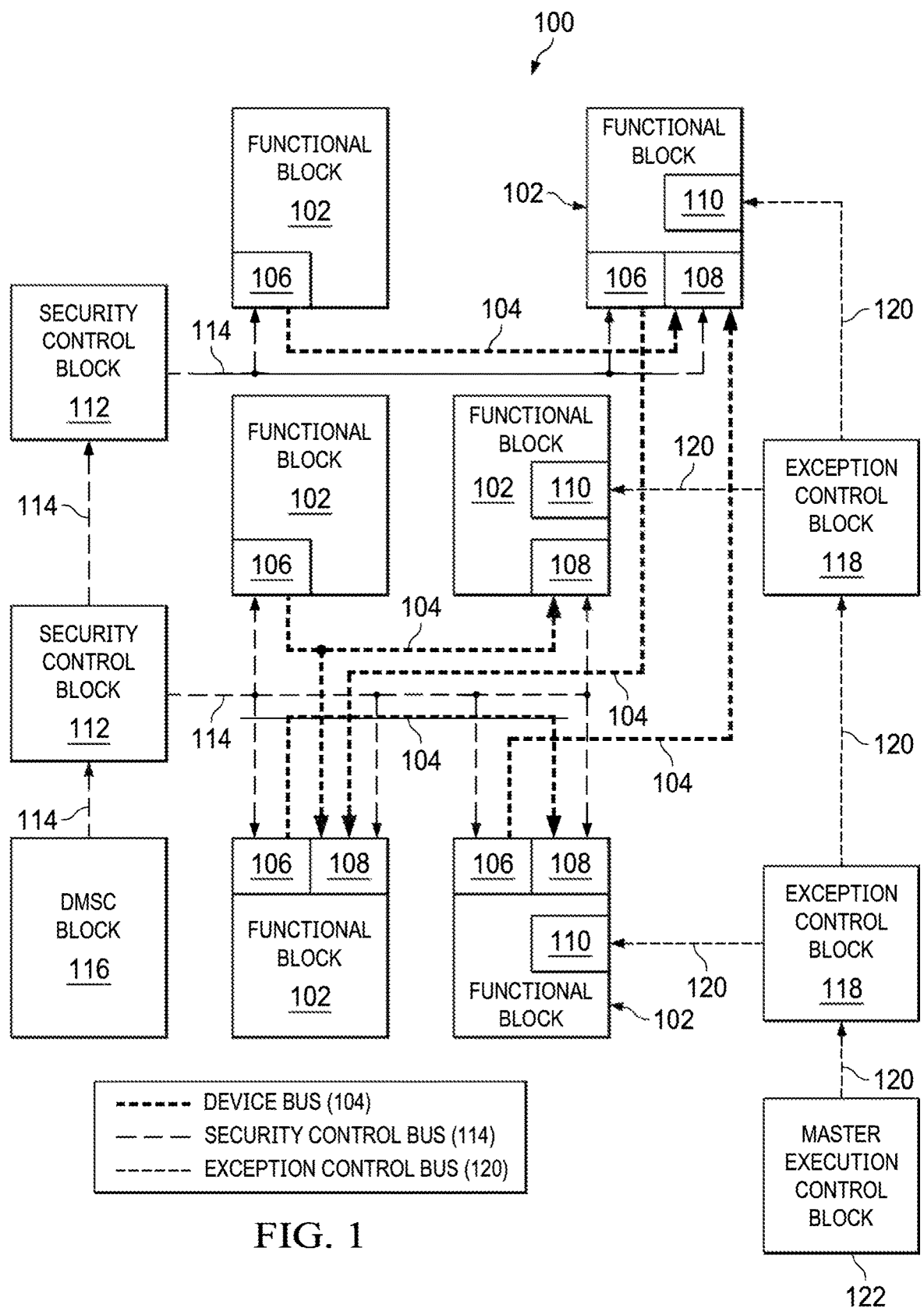
FIG. 1 shows an example of a functional block layout of an SoC.

FIG. 1 shows an example of a functional block layout of an SoC 100. As shown in FIG. 1, various functional blocks 102 in the SoC 100 are connected to each other by a device bus 104. A few functional blocks 102 are shown. The number of functional blocks 102 in an SoC can vary. The device bus 104 refers to the bus or busses which connect(s) the various non-security and non-security exception functional blocks 102. In typical prior art embodiments, a device bus 104 also connects to security and security exception blocks. Messages between functional blocks 102 are generally transmitted through the device bus 104. Some (or all) functional blocks 102 contain initiator-side firewall blocks 106, which apply security-related content (such as an identifier (ID) of the functional block 102 which originated the message, and encryption) to messages to prepare messages for transmission to other functional blocks 102. Some (or all) functional blocks 102 contain receiver-side firewall blocks 108, which determine (such as by checking the ID attached to the message by the corresponding initiator-side firewall block 106) whether a message has permission to be accessed by a respective functional block 102 receiving the message (for example, to execute the contents of the message or to pass the message to a downstream recipient), and to enable such access if permission is confirmed. Access by the respective functional block 102 refers to permission for the message to be acted upon by resources of the functional block 102 other than (in addition to) (1) resources included within a corresponding receiver-side firewall block 108, and/or (2) resources which were utilized by the corresponding receiver-side firewall block 108 in determining whether the message has access permission for the functional block 102. One or more functional blocks 102 also contain exception probe blocks 110 connected to initiator-side firewall blocks 106 and/or receiver-side firewall blocks 108 within the same functional block 102. Exception probe blocks 110 include memory elements which store configuration information for respective exception probe blocks 110.

Initiator-side firewall blocks 106 and receiver-side firewall blocks 108 are controlled by (subsidiary) security control blocks 112. Security control blocks 112 are connected to each other, and are connected to control initiator-side and receiver-side firewall blocks 106, 108, by a security control bus 114. Initiator-side firewall blocks 106 and receiver-side firewall blocks 108 (collectively, "firewall blocks" 106, 108) include memory elements which store configuration information for respective firewall blocks 106, 108. Security control blocks 112 also include memory elements which store configuration information for respective security control blocks 112; configuration information for security control blocks 112 is typically pre-set by hardware design for security purposes. Configuration information can determine, for example, whether and how different permission levels (such as user, supervisor, and debug modes) are applied to messages. The security control bus 114 is electrically isolated from the device bus 104, to prevent unauthorized access to the security control bus 114 (that is, the security control bus 114 is dedicated specifically to connecting security infrastructure; messages are not sent between functional blocks 102 via the security control bus 114). Accordingly, security control bus 114 interconnects are independent from device bus 104 interconnects. Security control blocks 112 are controlled by a single, exclusive device management and security control (DMSC) block 116. The DMSC block 116 is connected to control the security control blocks 112, and to control initiator-side and receiver-side firewall blocks 106, 108 (via the security control blocks 112), by the security control bus 114. The DMSC block 116 being a "single, exclusive" block refers to device structure underlying DMSC functionality being connected so that there are not multiple, independently operating loci of DMSC functionality (accordingly, there is a "single," not "multiple," DMSC blocks 116). This can be seen as DMSC functionality being connected serially, not in parallel, as seen from the security control blocks 112. The DMSC block 116 is capable of causing changes to configuration data stored in the memory elements of the firewall blocks 106, 108.

As can be seen from FIG. 1, firewall blocks 106, 108 are generally distributed throughout an SoC 100 employing hardware-based security. Use of the DMSC block 116 as a unified control for security infrastructure of the SoC 100, along with an independent security control bus 114, enables configuration of memory so that software can view memory elements of the initiator-side and receiver-side firewall blocks 106, 108 (together, firewall blocks 106, 108), as comprising a single, unified, contiguous memory region, as further described with respect to FIG. 2.

Exception probe blocks 110 determine when an exception occurs in initiator-side or receiver-side firewall blocks 106, 108. Exception probe blocks 110 are controlled by exception control blocks 118. Exception probe blocks 110 include memory elements which store configuration information of the exception probe blocks 110. Exception control blocks 118 are connected to each other, and are connected to control the exception probe blocks 110, by an exception control bus 120. The exception control bus 120 is electrically isolated from the device bus 104, and from the security control bus 114, to prevent unauthorized access to the exception control bus 120.

Initiator-side firewall blocks 106 can be configured to, for example, assign unique security IDs to and/or assert security attributes of messages between functional blocks 102. Receiver-side firewall blocks 108 can be configured to, for example, set permissions corresponding to source functional blocks 102 or other properties of messages which are (or are not) allowed to access corresponding destination functional blocks 102.

Figure 2:
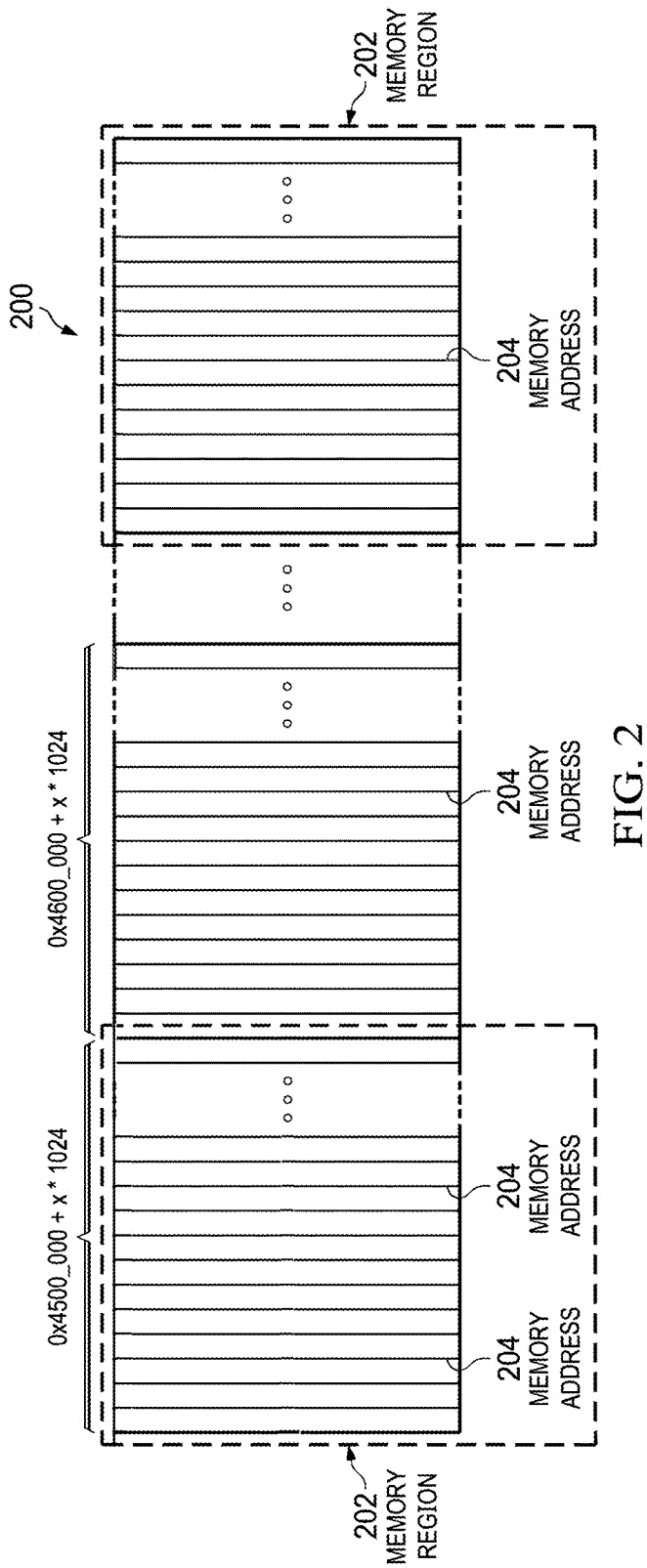
FIG. 2 shows an example map of a memory used to access the various memories of firewall blocks.

FIG. 2 shows an example map of a memory 200 used to access the various memories of firewall blocks 106, 108. The memory 200 spans a fixed range within a memory of the SoC 100. The memory 200 contains multiple memory regions 202 (divided depending on, for example, the requirements of the particular SoC 100) storing pointers to the locations of the various memories of the firewall blocks 106, 108. Different memory regions 202 contain pointers to locations of memories corresponding to different types of functions (different subsystems) of the firewall blocks 106, 108. For example, memory regions 202 can correspond to (contain pointers enabling access to) security configuration data for initiator-side and receiver-side firewall blocks 106, 108, security configuration data for security control blocks 112, exception configuration data for initiator-side and receiver-side firewall blocks 106, 108, boot control configuration data, emulation configuration data, virtualization configuration data, and quality-of-service (QoS) configuration data. Accordingly, the memory 200 acts as a middleman (intermediary) between (1) software and (2) firewall block 106, 108 configuration memories.

Each firewall block 106, 108 is allocated a different identifier (ID). Identical initiator-side firewall block 106 designs and identical receiver-side firewall block 108 designs can be used across a platform comprising multiple SoCs 100. This enables IDs to be allocated globally for all firewall blocks 106, 108 in all SoCs 100 in the same platform, so that identically situated (e.g., with respect to a particular subsystem type of functional block 102), identically designed firewall blocks 106, 108 in different SoCs in a platform can receive the same ID. Having the same ID enables the memory elements of identically situated, identically designed firewall blocks 106, 108 in different SoCs in a platform to be called the same way by software. Global assignment of IDs can simplify configuration of firewall blocks 106, 108 in SoCs throughout a platform: often, it is advantageous to identically configure identically-designed firewall blocks 106, 108. This is facilitated by the ability to access firewall blocks 106, 108 on different SoCs in the same way. Global assignment of IDs also enables a provision to software of a consistent view of configuration of firewall blocks 106, 108 (with configuration memory consistently and predictably addressable based on firewall block 106, 108 ID) when there are multiple types of firewall blocks 106, 108. This consistent view of configuration memory can also be provided when the number of firewall blocks 106, 108 varies from SoC to SoC across a platform (pre-allocated address space for a type of firewall blocks 106, 108 (such as boot control or QoS) can be sized to accommodate the number of that type of firewall blocks 106, 108 being used).

Types of firewall blocks 106, 108 can include, for example, memory region firewall blocks and channelized firewall blocks. Memory region firewall blocks can, for example, serve functional blocks (memories) as a whole, or enable different permissions for different regions of corresponding memories. For example, a Host-1 can have full access to a memory behind a memory region firewall block, while a Host-2 has only a window view of the memory behind the memory region firewall block. Channelized firewall blocks are typically fine-grained, with larger numbers of firewall structures gating access to respective, relatively finely-divided portions of the memory.

IDs can be encoded in register transfer level (RTL) configuration files, with IDs fixed for respective SoCs. RTL automation scripts can be used to determine memory addresses corresponding to respective IDs as described below.

Each firewall block 106, 108 ID can be used to create, for each memory region 202 storing security configuration data, a memory address 204 that corresponds uniquely (on the corresponding SoC 100) to that firewall block 106, 108. This can be done using a pre-defined mathematical calculation. For example, pointers to memory elements in a memory region 202 storing configuration data for different firewall blocks 106, 108 can be addressed so that a first bit of stored pointer information for one firewall block 106, 108 is 1024 bits away from a first bit of adjacently-stored pointer information for another firewall block 106, 108. Accordingly, an example 48 bit address for a firewall block 106, 108 can be configured to be calculated as: for firewall block 106, 108 numbered "x" (x≥0), address=0x4500_0000+x*1024. This can be used to create a memory map for secure configuration data that is unified and contiguous, so that software can access security asset memory as if it were located in a single, compact memory space, rather than distributed across the SoC.

This can also be done for memory regions 202 storing pointers to configuration memories for exception control blocks 110. Exception control blocks 118 and exception probe blocks 110 are connected by an exception control bus 120 which is electrically isolated from the device bus 104 and the security control bus 114, and configuration of exception probe blocks 110 is controlled by a single master exception control block 122 (similarly to control of configuration of firewall blocks 106, 108 by the DMSC block 116). Pointers to configuration memories of different groups of blocks are stored in memory regions 202 with different base addresses, and different groups of blocks have different respective ID ranges to generate memory addresses within respective memory regions 202 corresponding to respective blocks.

A unified, contiguous memory map enables software designed for firewall blocks 106, 108 having designs which are reused from system to system (which can save hardware design resources) to also be reused from system to system. For example, consider a first SoC which uses four initiator-side firewall blocks 106 and two receiver-side firewall blocks 108, and a second SoC which uses six initiator-side firewall blocks 106 and five receiver-side firewall blocks 108. If the firewall block 106, 108 designs from the first SoC are reused for the second SoC, then security configuration software for the second SoC can reuse the security configuration software for the first SoC, and (with respect to firewall blocks 106, 108) only needs to add code to address the newly added two initiator-side firewall blocks 106 (six minus four) and three receiver-side firewall blocks 108 (five minus two). This can save software design resources, reducing design cost, complexity, and the time it takes to launch a corresponding product. Reduction in complexity can, in turn, reduce the likelihood of design errors, further reducing costs and product launch time.

Figure 3:
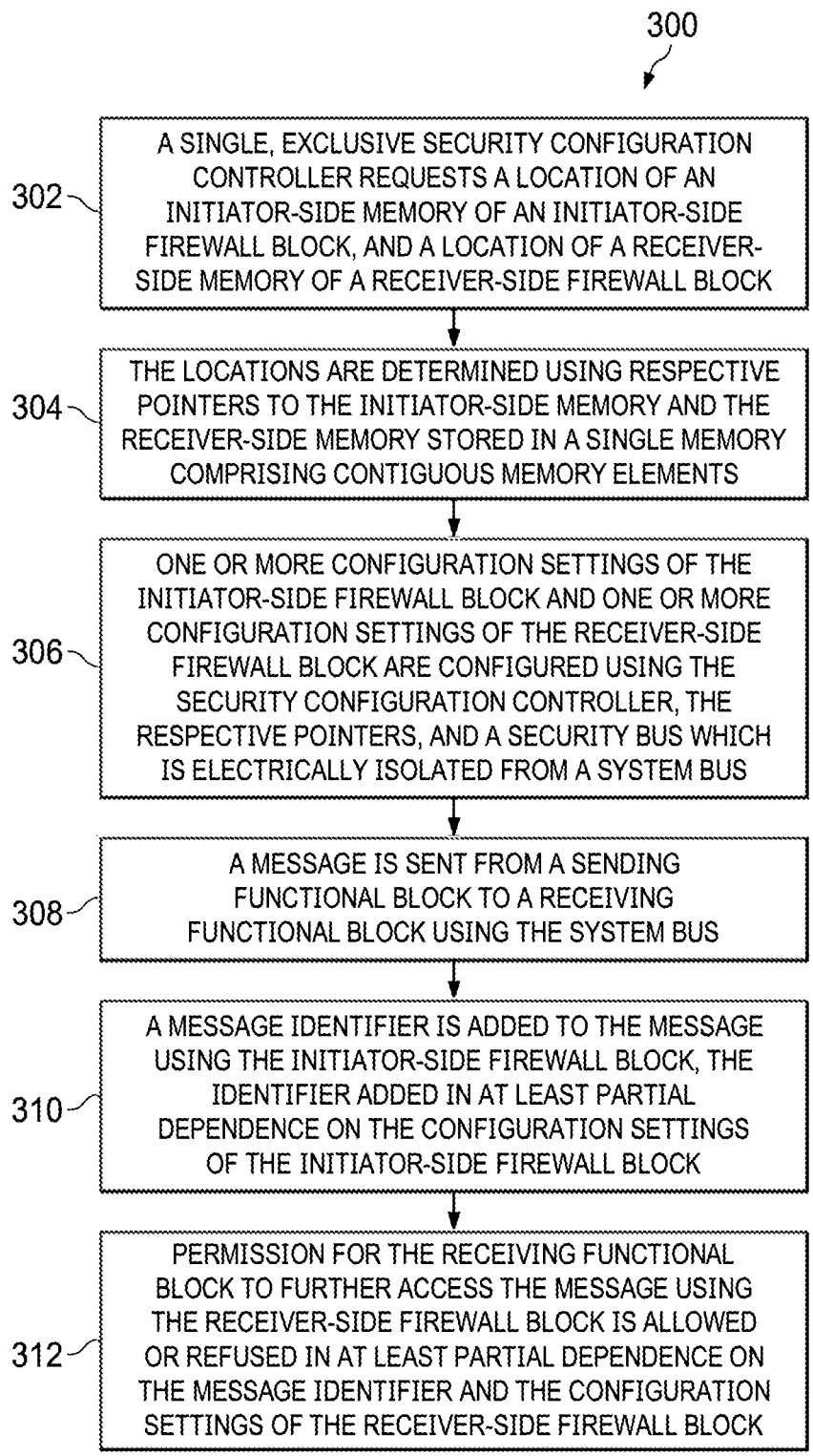
FIG. 3 shows an example of a process for sending messages between functional blocks in an SoC.

FIG. 3 shows an example of a process 300 for sending messages between functional blocks in an SoC. In step 302, a single, exclusive security configuration controller requests a location of an initiator-side memory of an initiator-side firewall block, and a location of a receiver-side memory of a receiver-side firewall block. In step 304, the locations are determined using respective pointers to the initiator-side memory and the receiver-side memory stored in a single memory comprising contiguous memory elements. Addresses of the pointers within the single memory are determined in at least partial dependence on respective unique firewall identifiers of the initiator-side firewall block and of the receiver-side firewall block. In step 306, one or more configuration settings of the initiator-side firewall block and one or more configuration settings of the receiver-side firewall block are configured using the security configuration controller, the respective pointers, and a security bus which is electrically isolated from a system bus. In step 308, a message is sent from a sending functional block to a receiving functional block using the system bus. In step 310, a message identifier is added to the message using the initiator-side firewall block, the identifier added in at least partial dependence on the configuration settings of the initiator-side firewall block. In step 312, permission for the receiving functional block to further access the message using the receiver-side firewall block is allowed or refused in at least partial dependence on the message identifier and the configuration settings of the receiver-side firewall block.

Modifications are possible in the described embodiments, and other embodiments are possible, within the scope of the claims.

In some embodiments, use of globally-allocated firewall block IDs simplifies creation of chip support library (CSL) files.

In some embodiments, ID ranges in a memory are reserved for future expansion.

In some embodiments, multiple secure worlds, corresponding to multiple different security levels, co-exist within an SoC. In some embodiments, whether and how different secure worlds are used is determined by firewall block configuration information.

In some embodiments, one or more firewall blocks are not contained within a functional block.

In some embodiments, the DMSC block sets one configuration of one firewall block at a time. In some embodiments, the DMSC block sets one configuration of multiple firewall blocks at a time. In some embodiments, the DMSC block sets multiple configurations of one firewall block at a time. In some embodiments, the DMSC block sets multiple configurations of multiple firewall blocks at a time.

In some embodiments, the DMSC block can set configuration information of security control blocks.

What is claimed is:

1. A processor device comprising:
a first functional unit that includes a first firewall that includes a first configuration memory;
a second functional unit that includes a second firewall that includes a second configuration memory;
a device bus coupled between the first firewall and the second firewall; and
a memory that includes a contiguously addressed set of memory elements configured to store a first set of pointers to locations in the first configuration memory and a second set of pointers to locations in the second configuration memory;
wherein the first firewall is configured to apply an identifier to a message directed to the second functional unit, the identifier based on data stored in the first configuration memory; and
wherein the second firewall is configured to determine, based on the identifier and data stored in the second configuration memory, whether the second functional unit is permitted to access the message.

2. The processor device of claim 1, wherein:
the identifier is a first identifier associated with the first firewall;
the second firewall has a second identifier associated therewith; and
the memory is configured to:
store the first set of pointers at a first set of memory addresses based on the first identifier; and
store the second set of pointers at a second set of memory addresses based on the second identifier.

3. The processor device of claim 2, wherein the first set of memory addresses is adjacent to the second set of memory addresses.

4. The processor device of claim 2, wherein:
the first identifier is associated with a function of the first functional unit; and
the second identifier is associated with a function of the second functional unit.

5. The processor device of claim 1, wherein:
the first firewall is an initiator-side firewall; and
the second firewall is a receiver-side firewall.

6. The processor device of claim 1 further comprising:
a configuration controller coupled to the memory; and
a security bus coupled between the configuration controller and the first firewall.

7. The processor device of claim 6, wherein the configuration controller is configured to write data to the first configuration memory using the first set of pointers.

8. The processor device of claim 7, wherein the first firewall is configured to apply a permission level to the message directed to the second functional unit based on the data written to the first configuration memory.

9. The processor device of claim 7, wherein the first firewall is configured to determine whether the first functional unit is permitted to access a message received by the first functional unit based on the data written to the first configuration memory.

10. The processor device of claim 1 further comprising:
a security control block that includes a third configuration memory, wherein the contiguously addressed set of memory elements of the memory is configured to store a third set of pointers to locations in the third configuration memory; and
a security bus coupled between the security control block and the first firewall.

11. The processor device of claim 1, wherein:
the first functional unit includes an exception control block that includes a third configuration memory; and
the contiguously addressed set of memory elements of the memory is configured to store a third set of pointers to locations in the third configuration memory.

12. The processor device of claim 1, wherein the second firewall is a receiver-side firewall, the second functional unit further including an initiator-side firewall.

13. A system-on-a-chip comprising:
a first functional unit that includes a first firewall that includes a first configuration memory;
a second functional unit that includes a second firewall that includes a second configuration memory;
a device bus coupled between the first functional unit and the second functional unit, the device bus configured to carry messages between the first functional block and the second functional block;
a memory configured to store, at a first set of contiguous addresses, a first set of pointers to the first configuration memory and, at a second set of contiguous addresses, a second set of pointers to the second configuration memory such that the first set of contiguous addresses is adjacent to the second set of contiguous addresses;
a configuration controller coupled to the memory; and
a security bus isolated from the device bus and coupled between the configuration controller and each of the first firewall and the second firewall;
wherein the configuration controller is configured to write data to the first configuration memory via the security bus using the first set of pointers.

14. The system-on-a-chip of claim 13, wherein the first firewall is configured to apply a permission level to a message directed between the first functional unit and the second functional unit based on the data written to the first configuration memory.

15. The system-on-a-chip of claim 13, wherein:
the first firewall has a first identifier associated therewith;
the second firewall has a second identifier associated therewith;
the first set of contiguous addresses is based on the first identifier; and
the second set of contiguous addresses is based on the second identifier.

16. The system-on-a-chip of claim 15, wherein:
the first firewall is configured to apply the first identifier to a message directed between the first functional unit and the second functional unit; and
the second firewall is configured to determine whether the second functional unit is permitted to access the message based on the first identifier and data stored in the second configuration memory.

17. The system-on-a-chip of claim 15, wherein:
the first identifier is associated with a function of the first functional unit; and
the second identifier is associated with a function of the second functional unit.

18. The system-on-a-chip of claim 13, wherein the configuration controller is further configured to write data to the second configuration memory via the security bus using the second set of pointers.

19. The system-on-a-chip of claim 18 further comprising a security control block coupled between the configuration controller and the security bus, wherein:
the security control block includes a third configuration memory; and
the memory is configured to store, at a third set of contiguous addresses, a third set of pointers to the third configuration memory.

20. The system-on-a-chip of claim 13, wherein:
the first functional unit includes an exception control block that includes a third configuration memory; and
the memory is configured to store, at a third set of contiguous addresses, a third set of pointers to the third configuration memory.

* * * * *